United States Patent [19]

Merhav

[11] 4,445,376
[45] May 1, 1984

[54] APPARATUS AND METHOD FOR MEASURING SPECIFIC FORCE AND ANGULAR RATE

[75] Inventor: Shmuel J. Merhav, Haifa, Israel

[73] Assignee: Technion Research and Development Foundation Ltd., Haifa, Israel

[21] Appl. No.: 357,714

[22] Filed: Mar. 12, 1982

[51] Int. Cl.³ .................. G01C 21/10; G01P 15/08
[52] U.S. Cl. .................. 73/510; 73/517 R; 73/178 R; 364/453
[58] Field of Search .................. 73/510, 504, 517 R, 73/178 R; 364/453

[56] References Cited

U.S. PATENT DOCUMENTS

| | | | |
|---|---|---|---|
| 3,014,374 | 12/1961 | Johnston | 73/517 R |
| 3,253,471 | 5/1966 | Maillard | 73/517 R |
| 4,188,816 | 2/1980 | Mairson | 73/517 R |
| 4,222,272 | 9/1980 | Mairson | 73/517 R |

*Primary Examiner*—James J. Gill
*Attorney, Agent, or Firm*—Benjamin J. Barish

[57] ABSTRACT

Apparatus and method for measuring specific force and angular rate of a moving body, particularly useful for a non-gyroscopic inertial measuring unit, comprises an orthogonal triad of rotating accelerometers, each producing an output signal "a", from which output signals are derived both (1) the angular rate vector $\Omega$ by multiplying the accelerometer output signal "a" by the function "$Sgn Cos \omega t$" and integrating the resulting product over the cyclic period, and (2) the specific force vector F, by integrating the output signal "a" over the cyclic period, this processing of the accelerometer output signals substantially suppressing the unwanted components of these signals.

19 Claims, 6 Drawing Figures

$$\hat{p}_c = p + \frac{rp}{2\omega} - \frac{\hat{r}_c \hat{p}_c}{2\omega}$$

$$\hat{q}_c = q + \frac{pq}{2\omega} - \frac{\hat{p}_c \hat{q}_c}{2\omega}$$

$$\hat{r}_c = r + \frac{qr}{2\omega} - \frac{\hat{q}_c \hat{r}_c}{2\omega}$$

APPARATUS AND METHOD FOR MEASURING SPECIFIC FORCE AND ANGULAR RATE

RELATED PATENT APPLICATIONS

The present application relates to co-pending Patent Application Ser. No. 357,715 filed Mar. 12, 1982 directed to another implementation of the invention described in the present application, namely to an implementation including vibrating accelerometers.

FIELD OF THE INVENTION

The present invention relates to apparatus and method for measuring specific force (sometimes referred to as linear acceleration), and angular rate (sometimes referred to as angular velocity), of a moving body, and also to a processor useful in such an apparatus and method. The invention is particularly applicable in a high-precision non-gyroscopic Inertial Measurement Unit (IMU) for an Inertial Navigation System (INS), and is therefore described below with respect to this application.

Inertial Navigation Systems (INS), for use in navigating a body moving in space, require the precise measurements of the three components of specific force along the linear body axes, and the three components of angular rate about the body axes. The principal trend in INS technology throughout the past decade is towards the strapdown concept based, essentially, on the use of a triad of single axis gyroscopes, or a pair of two-axis gyroscopes, and a triad of linear accelerometers. Recent technological efforts have focused on the gryscopes with a view to meet the large dynamic range ($>10^7$) requirements in strapdown systems while providing good long-term null-point stability in the order of $0.01 \div 0.1$ deg/hr and, at the same time, attempting to meet moderate cost requirements. The main fruits of these efforts have been the dry-tuned-rotor two-axis gyroscope and the ring laser gyro. However, notwithstanding the considerable progress in gyro technology, the cost per unit is still in the $5,000–$10,000 range. Consequently it is quite difficult to provide an Inertial Measurement Unit (IMU), of a gyro and accelerometer triad assembly, at a cost less than $30,000–$100,000 depending on the required accuracy of performance ($10 \div 1$ nm/hr). Accelerometers with INS quality, however, have become available in the $1,000 range per unit. It is therefore highly desirable to devise an IMU without gyroscopes so that both the specific force vector F, and the angular rate vector $\Omega$ with respect to inertial space, are measured by accelerometers only.

A number of proposals have been made to provide a non-gyroscopic inertial measuring unit with the accuracy required in tactical and long-term navigational methods, but the systems so far proposed have been found to have a number of drawbacks.

Figure 1:
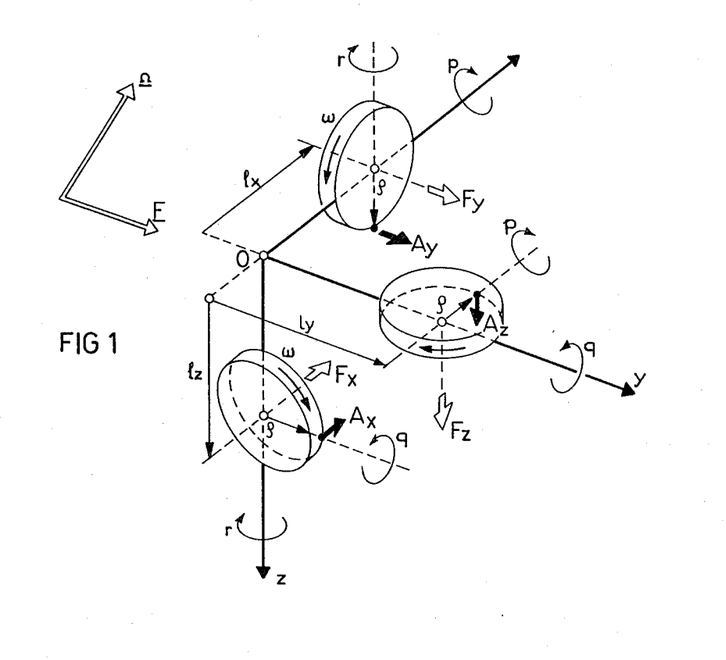
FIG. 1 is a diagram, helpful in explaining the present invention, schematically illustrating the orientation of three rotating accelerometers in an orthogonal body fixed-axis system, the accelerometers being shown at positions corresponding to t=0.

Thus, the principle of rotating accelerometers was proposed as early as 1965, in a published article by Krishman, V. "Measurement of Angular Velocity and Linear Acceleration Using Linear Accelerometers," Journal of Franklin Institute, Vol. 280, No. 4, October 1965, pp. 305–315. This article disclosed the use of three accelerometers $A_x$, $A_y$, $A_z$ on three orthogonal platforms rotating at constant angular velocities $\omega$ (as shown in FIG. 1). Their outputs $a_x$, $a_y$, $a_z$, are approximately given by the sums of $F_x$, $F_y$, $F_z$, and the corresponding "Coriolis" forces $2q\omega\rho \cos \omega t$, $2r\omega\rho \cos \omega t$, $2p\omega\rho \cos \omega t$. Since $\omega$ and $\rho$ are known constants, q, r, p, can, in principle be separated from $F_x$, $F_y$, $F_z$ so that all the basic IMU information is essentially provided by $A_x$, $A_y$, $A_z$. The method of separating F from $\Omega$ in this article is based on sampling, $A_x$, $A_y$, $A_z$ outputs $a_x$, $a_y$, $a_z$ at two equally spaced points in one revolution. By taking the sums, one obtains approximately $F_x$, $F_y$, $F_z$; and by taking the differences, one obtains approximately p, q, r.

However, the techniques described in that publication, for separating from the accelerometer output signals the specific force vectors F and the angular rate vectors $\Omega$, have a number of shortcomings which severely limit the applicability of the described system in INS requirements. For example, the signal separation in the described system uses only one pair of sample points 180° apart and assumes only negligible variation of "F" and "$\Omega$" throughout the period of revolution; but it can be shown that the variations existing in actual vehicular motion are significant and give rise to substantial dynamic errors in "F" and "$\Omega$". In addition, errors due to "orthogonal terms" existing in rotating mechanisms tend to contribute large errors which inherently result from the sampling process involved. Further, the described method does not cope with errors due to angular rate cross products. Probably for the foregoing drawbacks, as well as others that could be mentioned, the concept described in that publication has not matured to date as a practical technology.

Two further proposals for non-gyroscopic IMU's are described in U.S. Pat. Nos. 4,188,816 and 4,222,272. Actually, both of these patents appear to relate to the same system, the first patent mainly addressing the mechanical mechanisation and the underlyig dynamical equations, and the second patent mainly addressing the solution of the electronic signal processor designed to separate the specific force vector "F" from the angular rate vector "$\Omega$".

Thus, U.S. Pat. No. 4,188,816 discloses a system which requires four accelerometers to measure the angular and linear accelerations and to measure spinning velocity with respect to inertial space. However, considering the extra complications of the required mechanisation for such a large number of accelerometers, as well as the surrender of ruggedness and simplicity, it would hardly appear that the concept described in that patent could be considered as competitive with gyroscopes at the present state of the art.

U.S. Pat. No. 4,222,272 relates mostly to the signal processor, and discloses an arrangement which is based on the well-known principle of synchronous detection. However, such an arrangement is considered to be inadequate for the precision required in INs for a number of reasons, including the following: Such an arrangement requires low pass filters which severely reduce the band width of both the specific force measurement and the angular rate measurement. In addition, the disclosed technique uses ring demodulators which, according to the existing technology, is at most of 1% accuracy; this is totally inadequate in terms of null-point stability, linearity and dynamic range. Further, the technique disclosed in that patent of generating corrective signals to remove dynamical errors algebraically, would require extremely high precision amplifiers and resistors, contributing considerably to the overall cost. Still further, the disclosed system requires at least nine analog-to-digital converters to feed the microprocessor, again contributing substantially to the overall cost and complexity of the system.

OBJECTS OF THE INVENTION

An object of the present invention is to provide another non-gyroscopic method and apparatus for measuring specific force and angular velocity of a moving body having advantages in the foregoing respects. Other objects of the present invention are to provide a processor for use in the novel apparatus, and a method for practicing the present invention.

More particularly, one main object of the invention is to provide means for separating, from the accelerometer output signals "a", signals corresponding to the specific force vector "F" and the angular velocity vector "$\Omega$", in such manner that the unwanted components of the accelerometer output signals "a" are suppressed to a sufficiently low level so as to be compatible with INS precision requirements.

A further object of this invention is to provide an electronic processor which has a sufficiently low value of inherent null-point off-set drift and noise, so as to be compatible with INS precision requirements.

A still further object of the invention is to provide an electronic processor which separates F from $\Omega$ with sufficient precision to avoid "crosstalk" interaction at a low level compatible with INS precision.

A still further object of the invention is to execute the required separation of F from $\Omega$ without using low-pass filters or equivalent devices so that the separated signals representing F and $\Omega$ are provided at a frequency no smaller than the spin frequency $\omega$.

A still further object of the invention is to provide the signals representing F and $\Omega$ with such low scale factor errors and non-linearities so as to be compatible with INS precision requirements.

A still further object of the invention is to provide an electronic processor which outputs the signals representing F and $\Omega$ in analog form completely compatible with analog-to-frequency or analog-to-digital converters commonly used in modern INS sensor/digital computer interfaces.

A still further object of the invention is to provide an electronic processor having sufficient simplicity so as to render its cost but a small part of a complete F and $\Omega$ measurement device, thus providing a technological solution strongly competitive with gyro based devices of similar performance.

A still further object of the invention is to realize an F and $\Omega$ sensor having a dynamic range in the order of $10^7$ compatible with INS strapdown applications and yet having a sufficiently small angular rate sensitivity so as to be applicable in INS Gimbal-stable platform mechanisations.

BRIEF SUMMARY OF THE INVENTION

According to one aspect of the present invention, there is provided apparatus for measuring the specific force and angular rate of a moving body by means of a plurality of accelerometers mounted on mutually-perpendicular axes, characterized in that the apparatus includes:

(a) cyclic driving means for driving each accelerometer at a predetermined cyclic frequency "$\omega$" to produce an output signal "a" from each accelerometer comprised of the angular rate vector "$\Omega$" and the specific force vector "F;"

(b) means for deriving, from each of said accelerometer output signals "a", a signal corresponding to the angular rate vector $\Omega$ which means include:
   (1) multiplying means for multiplying said accelerometer output signal "a" by the function "Sgn Cos $\omega t$" to produce the product signal "aSgn Cos $\omega t$", and
   (2) integrating means for integrating said product signal over the cyclic period; and (c) means for deriving from each of said accelerometer putput signals "a" a signal corresponding to the specific force vector F, said latter means including integrating means for integrating said output signal "a" over the cyclic period, In the preferred embodiment of the invention described below, each of the deriving means (b) and (c) further includes: resetting means for resetting the respective integrating means at the end of each cyclic period, and sampling means for sampling and holding the contents of the respective integrating means just before being reset at the end of the respective cyclic period.

In addition, each integrating means includes two integrating circuits connected in parallel, and switching means alternately enabling one and disabling the other of said two integrated circuits at the end of each cyclic period, to thereby provide each integrating circuit with a complete cyclic period for resetting.

In the preferred embodiment of the invention described below, the accelerometers are rotated. My copending Patent Application Ser. No. 357,715 filed Mar. 12, 1982 discloses other embodiments of the invention wherein the accelerometers are vibrated or oscillated.

The present invention also relates to the method of measuring specific force and angular velocity, and to a processor for use in this method and apparatus.

Further features and advantages of the invention will be apparent from the description below.

BRIEF DESCRIPTION OF THE DRAWINGS

The invention is herein described, by way of example only, with reference to the accompanying drawings, wherein.

PRELIMINARY MATHEMATICAL CONSIDERATIONS

Before describing the illustrated preferred embodiment of the invention, it is believed that the following discussion of the mathematical considerations involved will be helpful in understanding the invention and its advantages:

Dynamics (FIG. 1)

With reference to FIG. 1, the general equation for total acceleration measurable at a point mass moving in a rotating system is $$\underline{a} = \underline{F} + \underline{\dot{\Omega}} \times \underline{r} + 2\underline{\Omega} \times \frac{dr}{dt}\bigg|_b + \underline{\Omega} \times (\underline{\Omega} \times \underline{r}) + \frac{d^2r}{dt^2}\bigg|_b \quad (1)$$

where $\Omega$ is the angular rate or velocity vector of the system; F is the specific force vector; and r is the instantaneous distance of the point mass from the center of rotation of the system. In particular, $r=\rho+l$, wherein $\rho$ is the instantaneous vector distance of the point mass from its center of revolution, and l the fixed distance of the element's center of revolution to the system center of rotation. The index b indicates differentiation with respect to the rotating body axes. Eq. (1) can now be rewritten as follows:

$$\underline{a} = \underline{F} + \underline{\dot{\Omega}} \times (\underline{\rho} + \underline{l}) + 2\underline{\Omega} \times \frac{d\rho}{dt}\bigg|_b + \underline{\Omega} \times (\underline{\Omega} \times (\underline{\rho} + \underline{l})) + \frac{d^2\rho}{dt^2}\bigg|_b \quad (2)$$

substituting $\rho = [\rho_x \sin \omega t, \rho_y \sin \omega t, \rho_z \sin \omega t]'$, incorporating the noise components $n_x$, $n_y$, $n_z$ respectively and resolving a into $a_x$, $a_y$, and $a_z$ letting $\rho_x = \rho_y = \rho_z = \rho$ and rearranging terms, we have $$a_x = \underline{F_x} + l_z(\dot{q} + pr) + \underline{2\omega\rho \cos\omega t \left(q - \frac{\dot{r}}{2\omega}\right)} + \quad (3)$$
$$2\omega\rho \sin\omega t \left(r + \frac{\dot{q}}{2\omega}\right) + p\rho(q\cos\omega t + r\sin\omega t) + n_x$$

$$a_y = \underline{F_y} + l_x(\dot{r} + qp) + \underline{2\omega\rho \cos\omega t \left(r - \frac{\dot{p}}{2\omega}\right)} + \quad (4)$$
$$2\omega\rho \sin\omega t \left(p + \frac{\dot{r}}{2\omega}\right) + q\rho(r\cos\omega t + p\sin\omega t) + n_y$$

$$a_z = \underline{F_z} + l_y(\dot{p} + rq) + \underline{2\omega\rho \cos\omega t \left(p - \frac{\dot{q}}{2\omega}\right)} + \quad (5)$$
$$2\omega\rho \sin\omega t \left(q + \frac{\dot{p}}{2\omega}\right) + r\rho(p\cos\omega t + q\sin\omega t) + n_z$$

Each of the noise signals $n = [n_x, n_y, n_z]'$ is assumed to consist of three component as follows:

$$= n_d + n_v + n_r$$

where:

$n_d$—Low frequency (drift) noise
$n_v$—Sinusoidal (vibration) noise
$n_r$—Random zero-mean high-frequency noise.

Thus, in addition to the underlined desirable terms in Eqs. (3)–(5), there are a variety of additional undesirable terms potentially contributing to errors. These primarily result from the dynamical terms containing p,q,r and their derivatives, and from the sensor noise components contained in n.

An important feature of the present invention, as mentioned earlier, is that it provides means for separating $F_x$ from q, $F_y$ from r, and $F_z$ from p, in such a manner that the undesirable terms are suppressed to a sufficiently low level that the effect of cross-product terms qp, qr and rp is substantially eliminated.

Figure 2:
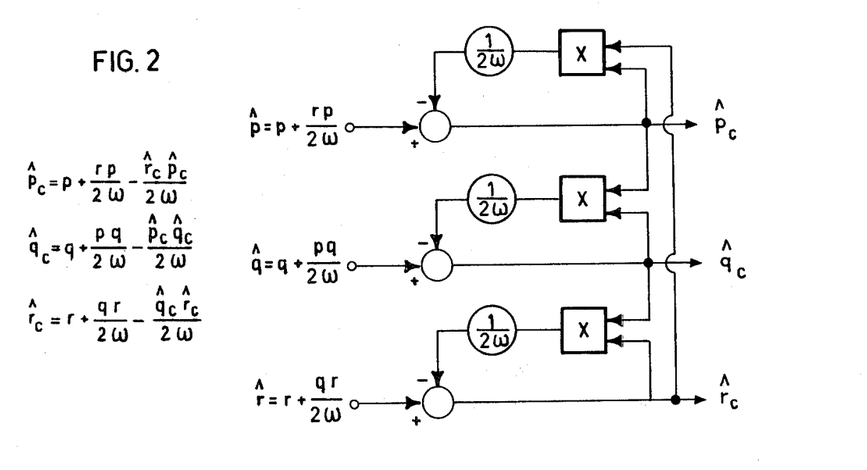
FIG. 2 is another diagram, helpful in explaining the present invention, illustrating the computation of errors in angular rates due to dynamical coupling.
Figure 3:
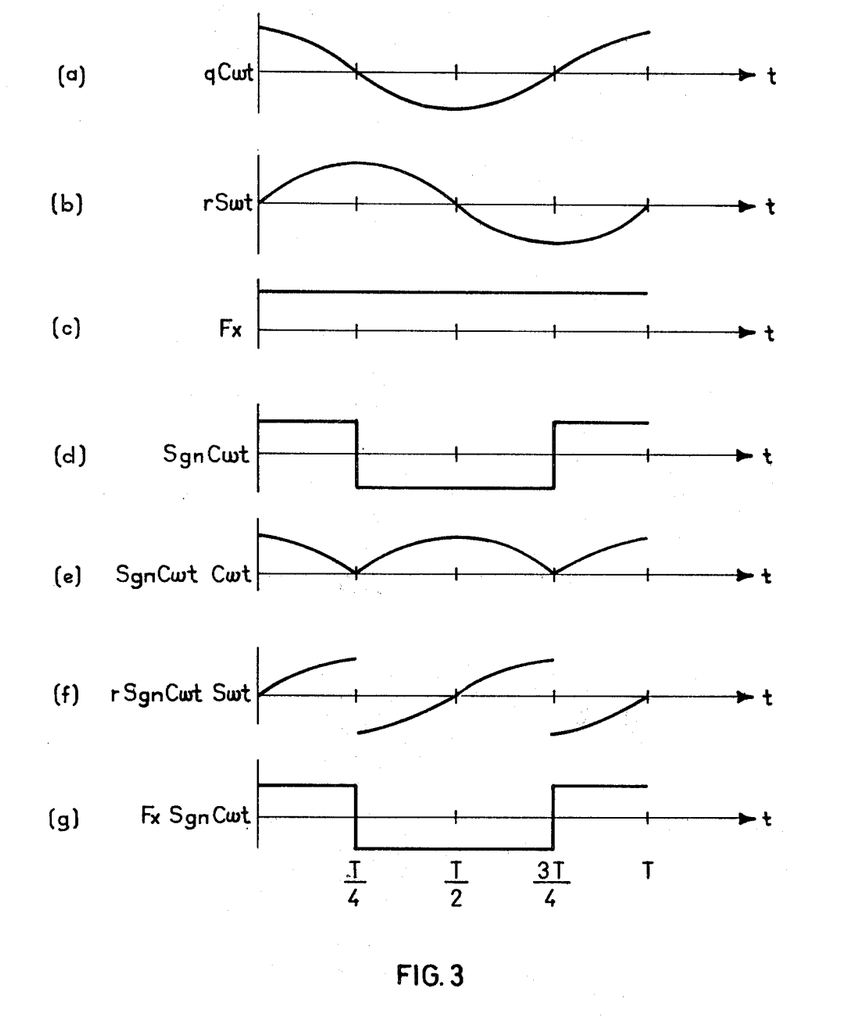
FIG. 3 comprises a series of wave-forms illustrating the manner of processing the accelerometer output signals in accordance with the present invention.

Principle of Signal Separation (FIGS. 2 and 3)

Denoting the computed values of p,q,r by $\hat{p},\hat{q},\hat{r}$, respectively, they can be determined from the measurements (3), (4), (5) as follows:

$$\hat{p} = \frac{1}{8\rho} \int_0^T a_z \, \text{sgn} \cos\omega t \, dt \quad (6)$$

$$\hat{q} = \frac{1}{8\rho} \int_0^T a_x \, \text{sgn} \cos\omega t \, dt \quad (7)$$

$$\hat{r} = \frac{1}{8\rho} \int_0^T a_y \, \text{sgn} \cos\omega t \, dt \quad (8)$$

or, alternatively, $\hat{q},\hat{r},\hat{p}$, by using the modulation function sng sin $\omega$t. The factor $8\rho$ is required for proper scaling, $T = 2\pi/\omega$ is the period of a complete revolution. The choice of the sgn modulation function is due to its simplicity of realization as shown later.

To demonstrate the principle of signal separation assume first $n_v = 0$, $n_r = 0$, $n_d =$ constant; and that p,q,r, $F_x,F_y,F_z$ are constant throughout T. By substituting (3), (4), (5) with all the time derivatives zero into (6), (7), (8), respectively, only the coherent terms with sgn cos $\omega$t are retained, thus:

$$\hat{p} = \frac{1}{8\rho}(2\omega\rho p + \rho rp) \int_0^T \cos\omega t \, \text{sgn} \cos\omega t \, dt = \quad (9)$$

$$\frac{2\omega p + rp}{8\omega} \int_0^{2\pi} \cos\omega t \, \text{sgn} \cos\omega t \, d(\omega t) =$$

$$\frac{(2\omega + r)p}{2\omega} \int_0^{\pi/2} \cos\omega t \, d(\omega t) = p + \frac{rp}{2\omega}$$

Thus, for p,q,r we have $$\begin{aligned} \hat{p} &= p\left(1 + \frac{\hat{r}}{2\omega}\right) \\ \hat{q} &= q\left(1 + \frac{\hat{p}}{2\omega}\right) \\ \hat{r} &= r\left(1 + \frac{\hat{q}}{2\omega}\right) \end{aligned} \quad (10)$$

Thus, even with $\Omega =$ const., dynamic scale factor error $r/2\omega$, $p/2\omega$, $q/2\omega$, respectively, may be present due to crossproducts of angular rates. These, however, can be compensated as indicated in FIG. 2 in which $\hat{p}_c$, $\hat{q}_c$, $\hat{r}_c$, denote compensated computed angular rates.

The relations indicated in FIG. 2 can be rewritten as $$\left.\begin{aligned}\hat{p}_c\left(1 + \frac{\hat{r}_c}{2\omega}\right) &= p\left(1 + \frac{r}{2\omega}\right)\\ \hat{q}_c\left(1 + \frac{\hat{p}_c}{2\omega}\right) &= q\left(1 + \frac{p}{2\omega}\right)\\ \hat{r}_c\left(1 + \frac{\hat{q}_c}{2\omega}\right) &= r\left(1 + \frac{q}{2\omega}\right)\end{aligned}\right\} \quad (11)$$

from which it follows that the compensation scheme, such as shown, in FIG. 2, enforces the solutions $\hat{p}_c = p$; $\hat{q}_c = q$; $\hat{r}_c = r$ as required. Possible offset errors in the multipliers are readily shown to have a negligibly small effect.

Thus, the effect of the cross-product terms pq, pr and rp are easily eliminated. The foregoing method for eliminating the cross-product terms pq, pr rp is only shown by way of example. Other computational algorithms for computing the corrected values $p_c$, $q_c$, $r_c$ may be used in an actual realization.

The specific forces $F_x$, $F_y$, $F_z$, are determined by $$\left.\begin{aligned}\hat{F}_x &= \frac{1}{T}\int_O^T a_x dt = F_x + l_z pr + n_{dx}\\ \hat{F}_y &= \frac{1}{T}\int_O^T a_y dt = F_y + l_x qp + n_{dy}\\ \hat{F}_z &= \frac{1}{T}\int_O^T a_z dt = F_z + l_y rq + n_{dz}\end{aligned}\right\} \quad (12)$$

The angular rate cross-product terms in (12) can easily be compensated by means of $\hat{p},\hat{q},\hat{r}$.

All the periodic terms in (3), (4), (5), drop on integrating over the period T.

The principle involved in the signal processing described above is graphically illustrated in FIG. 3 with reference, e.g., to Eqs. (3) and (7). Thus, diagrams (a)–(e) illustrate that integration over T of $q\rho$ sgn cos $\omega t$ yields q, and diagram (f) illustrates that integration of (sgn cos $\omega t$) sin $\omega t$ cancels out, and, as shown in diagram (g), so does $F_x$ sgn cos $\omega t$ along with its constant bias and slowly varying drift components $n_d$. At the same time, in the direct integration of $F_x$ over T as shown in diagram (a) and (b) all the periodic terms q cos $\omega t$ and r sin $\omega t$ drop-out, as required, and only the terms in accordance with Eqs. (12) are retained.

It is well known to those familiar with the art, that the residual error in the F channel as indicated in Eqs. (12), are, by far, more tolerable than errors in the $\Omega$ channel, which, as indicated above, are essentially cancelled by the signal processing method.

DESCRIPTION OF A PREFERRED EMBODIMENT

Figure 4:
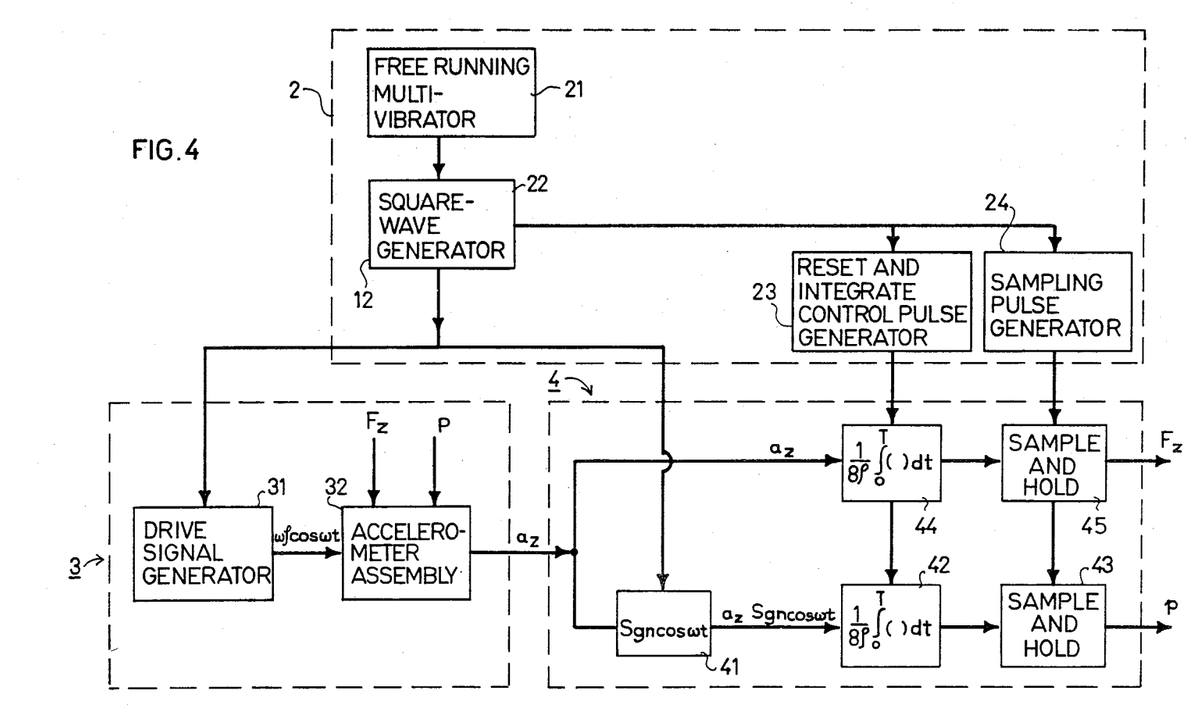
FIG. 4 is a block diagram illustrating one form of non-gyroscopic inertial measurement system constructed in accordance with the present invention.

General Arrangement (FIG. 4)

Reference is now made to FIG. 4 of the drawings, illustrating, in block diagram form, a non-gyroscopic inertial measuring unit (IMU) constructed in accordance with the abovedescribed principles of the present invention. Only one channel, namely that of accelerometer $A_z$, is illustrated in FIG. 4, it being appreciated that the other two channels, for accelerometers $A_x$ and $A_y$, are similarly constructed.

The unit illustrated in FIG. 4 includes three major sub-systems, namely: a control pulse generator, generally designated 2; an electromechanical drive, generally designated 3, for rotating each of the accelerometers of the triad illustrated in FIG. 1; and an electronic signal-separation processor, generally designated 4.

The control pulse generator 2 is driven by a free-running, multivibrator 21 having a high precision reference frequency 4f (f=1/T). The multivibrator controls a square-wave generator 22 which generates square waves at the frequency f. These square waves are used as synchronising pulses. They are applied to a reset-and-integrate control pulse generator 23, and to a sampling pulse generator 24, which generators are used to control the operation of processor 4, as will be described more particularly below.

Synchronising pulses from the square-wave generator 22 are also applied to a drive signal generator 31 within the electromechanical drive system 3. The output pulses from generator 31 drive the accelerometers of the assembly 32, such that the accelerometers are rotated about their respective axes at a predetermined frequency ($\omega$) equal to $2\pi f$. Thus, when the body to which the accelerometer assembly 4 is strapped down is subjected to a specific force $F_z$ and angular roll rate p, it produces a resultant output of $a_z$.

The accelerometer output $a_z$ is fed to the processor 4 for separating therefrom the specific force vector $F_z$ and angular rate vector p in such a manner so as to substantially suppress the undesirable components of signal $a_z$ in accordance with the equations (3)–(5) and (6)–(8) discussed above. In this case, we are considering the $F_z$ and p components, so that equations (5) and (7) are the pertinent ones.

Thus, processor 4 includes a multiplier circuit 41 for multiplying the introduced values $a_z$ by the function "sgn cos $\omega t$," outputting the product signal $a_z$sgn cos $\omega t$. This latter signal is fed to an integrating circuit 42 which integrates the product signal over the cyclic period T. The integrating circuit 42 is reset at the end of period T by the control pulse generator 23, but before being reset, it outputs its contents to a sample-and-hold circuit 43, which latter circuit is controlled by the sampling pulse generator 24. As described above, this processing of the accelerometer output signal $a_z$ causes the contents of the sample-and-hold circuit 43 to correspond to the angular rate vector "p".

The accelerometer output signal $a_z$ is also fed to a second channel within processor 4 including a second integrating circuit 44 which integrates that signal over the period T. Integrating circuit 44 is also reset at the end of period T by the control pulse generator 23, but just before being reset, it outputs its contents to another sample-and-hold circuit 45 controlled by the sampling pulse generator 24. It will be appreciated, from the previous discussion, that the contents of the sample-and-hold circuit 44 will correspond to the specific force vector $F_z$.

Figure 5:
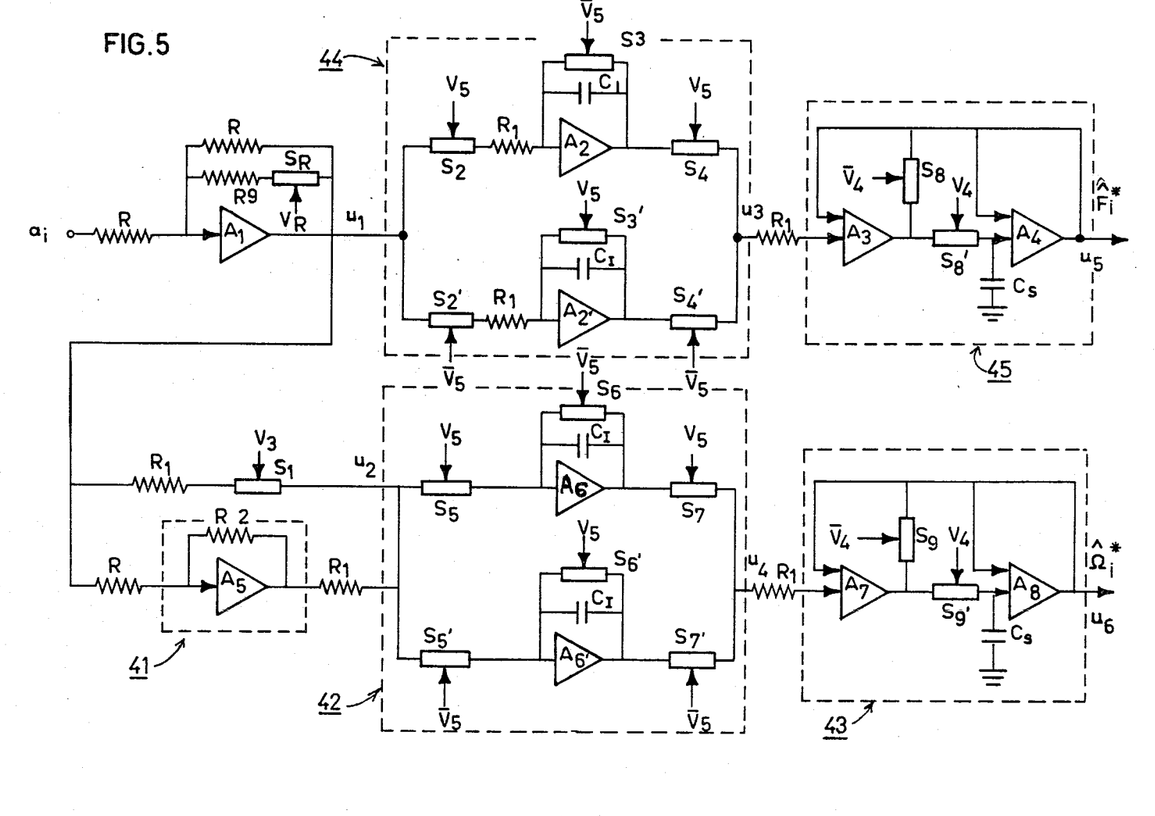
FIG. 5 is a schematic diagram of one form of signal processor implementation of the system of FIG. 4.
Figure 6:
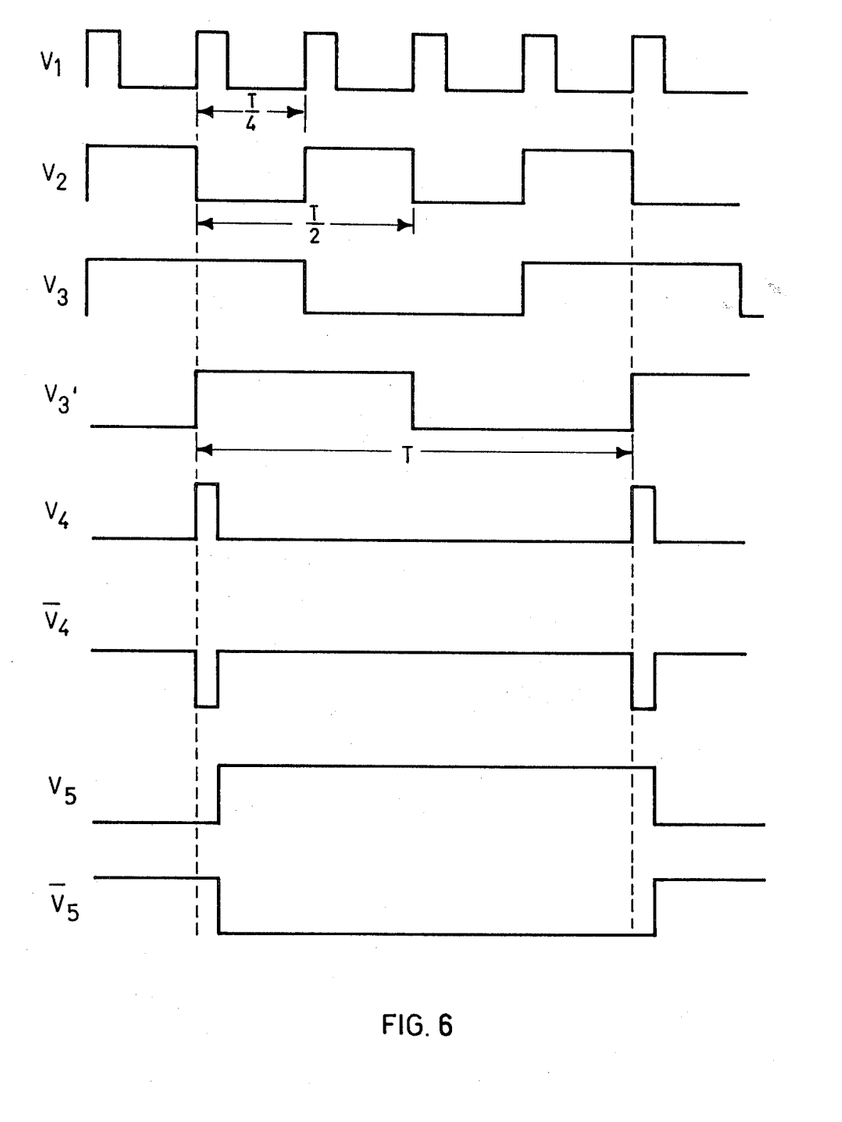
FIG. 6 illustrates the control and switching signals in the processor of FIG. 5.

Preferred Implementation of the Processor 4 (FIGS. 5 and 6)

FIG. 5 illustrates one preferred implementation of the processor 4 in the system of FIG. 4, and FIG. 6 illustrates the relevant control and switching signals. Thus, the sub-system including amplifier $A_5$ corresponds to multiplier circuit 41; the sub-system including amplifiers $A_6$ and $A_6'$ corresponds to the integrating circuit 42; the sub-system including amplifiers $A_7$ and $A_8$ corresponds to the sample-and-hold circuit 43; the sub-system including amplifiers $A_2$ and $A_2'$ corresponds to the integrating circuit 44; and the sub-system including amplifiers $A_3$ and $A_4$ corresponds to the sample-and-hold circuit 45.

More particularly, the input signal to the processor is indicated as $a_i$, it being appreciated that this is the general designation (i=x,y,z), designating the output signal from the respective accelerometer $A_x$, $A_y$, or $A_z$. This signal is applied to the input amplifier $A_1$ which is provided with a gain switch $S_R$ triggered by pulse $V_R$ so as to reduce the gain by a factor of "10" if the angular rate $\Omega_i$ (representing the angular rate p,q or r) exceeds one-tenth $\Omega_{max}$: pulse $V_R$ may be generated by a threshold circuit (not shown) which is operated whenever $a_i$ exceeds the maximum admissible input.

The output of amplifier $A_1$, designated $u_1$ in FIG. 5, is applied to the two channels illustrated in FIG. 4, namely to a first channel (the lower one in FIG. 5) including circuits 41, 42 and 43 for deriving the corresponding angular rate vector $\Omega_i$, and the second channel (the upper one in FIG. 5) including circuits 44 and 45 for deriving the corresponding specific force vector $F_i$. The latter circuits include switches $S_2$ to $S_9$ which are controlled by pulses $V_3$, $V_3'$, $V_4$, $\overline{V}_4$, $V_5$, $\overline{V}_5$ illustrated in FIG. 6; also illustrated in FIG. 6 are the pulses $V_1$ and $V_2$ from the control pulse generator 2 in FIG. 4.

Thus, the free-running multivibrator 21 in FIG. 4 generates the pulses $V_1$ at a frequency 4f (f=1/T) so that the period of each pulse $V_1$ is T/4. Square-wave generator 22, which may be a standard J-K flip-flop, generates square wave pulses $V_2$ at frequencies 2f, i.e., having a period T/2. The square-wave generator 22 includes two additional J-K flip-flops, which generates the signals $V_3$ and $V_3'$ at frequency f, i.e. having a period T, these latter signals being generated from the positive and negative steps of pulses $V_2$. Pulse $V_3'$ triggers another monostable multivibrator, this being the control pulse generator 23 in FIG. 4, which generates pulses $V_4$ and $\overline{V}_4$, the latter pulse triggering an additional J-K flip-flop, this being the sampling pulse generator 24 in FIG. 4, which generates pulses $V_5$ and $\overline{V}_5$.

With respect to the $F_i$ channel, sub-circuit 44 includes two amplifiers $A_2$ and $A'_2$, defining two identical integrating circuits which, with $u_1$ as their inputs, perform the integration of $u_i$ (corresponding to $a_i$) during the period T. These two integrating circuits are controlled by a voltage pulses $V_5$ and $\overline{V}_5'$ applied to the switches $S_2$, $S_2'$; $S_3$, $S_3'$; and $S_4$, $S_4'$, which produce switching operations alternately enabling one of the integrating circuits and disabling the other at the end of each cyclic period T, thereby providing each integrating circuit with a complete cyclic period T for resetting.

With respect to the $\Omega_i$ channel, sub-circuit 41 receives pulse $V_3'$ which control switch $S_1$ such that amplifier $A_5$ multiplies the input $u_1$ by the function sgn cos $\omega t$, so that the output signals $u_2$ is equal to the product $u_1$sign cos $\omega t$, as described with respect to circuit 41 in FIG. 4.

A similar switching scheme is provided with respect to the two integrating circuits of the sub-system 42 including the amplifiers $A_6$ and $A'_6$. The latter circuit includes switches $S_5$, $S'_5$; $S_6$, $S'_6$; and $S_7$, $S'_7$, which switches are controlled by pulses $V_5$ and $\overline{V}_5$ to alternately enable one and disable the other at the end of each cyclic period, thereby also providing each of these integrating circuits with a complete cyclic period for resetting. The integrating circuits of amplifiers $A_6$ and $A_6'$, however, integrate, over the cyclic period T, the signal $u_2$ outputted from multiplier circuit 41.

The two sample-and-hold circuits 43 and 45 are of standard design and are controlled by switches $S_9$, $S_9'$ and $S_8$, $S_8'$, respectively, which switches are triggered by the voltage pulses $V_4$ and $\overline{V}_4$. The pulse sequences $V_4$, $\overline{V}_4$, $V_5$, $V'_5$ are such that, immediately after the sampling pulse $V_4$, $V'_4$, the corresponding integrator is reset, and the next sampling pulse operates on the alternative integrator, as described above with respect to FIG. 4. The outputs $u_6$ and $u_5$ from the sample-and-hold circuits 43, 45, respectively, therefore, are proportional to the angular rate vector $\Omega_i$ and the specific force vector $F_i$, respectively, as described above with respect to FIG. 4.

It will be appreciated that, since the integrators and sample-and-hold circuits operate at frequencies f=1/T, the information signals $F_i$ and $\Omega_i$ are provided without any further reduction of bandwidth below $\omega$.

The signal $V_3$, apart from providing the commands to switch $S_1$ to generate the switching function sgn cos $\omega t$, is also used to generate or synchronize the cos $\omega t$ signal in the drive signal generator 31 in FIG. 4. This function can be implemented by any of the known existing techniques, e.g., by processing the square wave $V_3$ by a suitable narrow-band bandpass filter having a center frequency $\omega$ so that its output is, for all practical purposes, proportional to cos $\omega t$; or, if the drive generator 31 in FIG. 4 is a sine wave oscillator, $V_3$ may be used as a synchronizing signal to ensure that the frequency of cos $\omega t$ generated in signal generator 31 in FIG. 4 is equal to $\omega = 2\pi f$, where f is the frequency of $V_3$. Thus, with this interconnection of the signal separation processor with the control signal generator of the cyclic drive mechanism, the exact frequency and phase correspondence between the electronic processor and mechanical drive system is assured.

Precision and Stability

The foregoing description for the non-gyroscopic inertial measurement unit is believed capable of meeting navigational requirements in the 0.1–0.01 deg/hr class, particularly because of the precision and stability of modern CMOS amplifiers and control signal generators. Thus, modern CMOS chopper-stabilized operational amplifiers have null-point uncertainties as low as 0.01 $\mu$v/°C. Accordingly, even without temperature corrections of control of null-point, stability in the order of 1 $\mu$V contributed by these amplifiers and associated circuitry can be expected. For example, with a maximum angular rate of 40°/sec at the low range, (which is one-tenth of the complete maximum range of 400°/sec.) corresponding to 8 volts; 1 $\mu$V corresponds to a null-point uncertainty of 40°/sec × 1/(8 × 10$^6$) = (5 × 10$^{-6}$)/sec = 5 × 10$^{-6}$ × 3600°/hr = 0.018°/hr. This is well in the high performance INS class. Resistor inaccuracies only affect scale factor precision. Errors of this sort are by far less critical than null-point off-set errors. Resistors with precision in the order of 100 ppm are commercially available. Capacitor inaccuracies only affect the scale factors of the integrators $A_2$, $A_2'$, $A_6$, $A_6'$ and have the same effect as resistor uncertainties. The driving frequency $\omega$ can be maintained at sufficient stability for most applications with standard state of the art multivibrators. However, in applications of very high precision, the frequency $\omega$ can be controlled to extremely high precision by means of crystal-controlled clocks. The temperature dependence of leakage currents through the various switches, shown in FIG. 5, can be made to have very small effect on the overall output. In applications of very high precision, this residual temperature dependence can be calibrated and subsequently compensated for on the basis of on-line temperature measurements.

It follows from the foregoing that the type of design illustrated in FIG. 5, taking advantage of the performance of modern solid-state amplifiers, switches, multivibrators, and clocks, is capable of providing at relatively low cost, the precision required in the realization of high performance INS measurements.

Variations and Other Applications

The electronic processor of FIG. 5 serves to illustrate the principles involved. Its description is based on the assumption that the accelerometer provides analog voltages representing accelerations. The sgn cos ωt device, the integrators and their corresponding switches, and the sample-and-hold circuits, are based on common practice designs mainly for the purpose of describing the principles involved. Any of these foregoing circuits may in practice be executed in different variations, mainly designed to achieve the utmost in isolating leakage current, in perfecting the precision of the sng cos ωt circuit and the sample-and-hold devices, and in achieving the utmost in noise suppression. Alternative mechanizations using essentially the same mathematical principles may be advantageously used with other types of accelerometers. With accelerometers providing their output in digital format, the signal separation processor may be realized in digital form using a microprocessor to operate simultaneously on all three axes, x, y, z. Accelerometers providing their response in the form of a shift of frequency from a center frequency, may require additional interface providing a pulse frequency-to-voltage conversion in conjunction with the analog processor of FIG. 5. Alternatively, a suitably programmed microprocessor may directly operate on the pulse trains representing $a_x$, $a_y$, $a_z$. In all the aforementioned variations, the basic general principle underlying this invention will be retained.

As each device provides a pair of measurements, of specific forces $F_x$, q; $F_y$, r; and $F_z$, p, a triad of devices, orthogonally mounted provides a complete triad of inertial measurement pairs required mainly in inertial strapdown systems. Such triad pairs are required in all strapdown applications for both navigation and attitude control of flight, land and marine vehicles.

It will be appreciated that the Inertial Measurement Unit (IMU) described may be integrated with other navigational measurements to perform as a hybrid system, e.g., as a Doppler inertial system. Also, two devices may be orthogonally mounted on the inner gimbal of a gimballed platform to set up a gimballed INS in conjunction with an independent altimeter. Further, the invention could advantageously be embodied in systems other than inertial systems, for example systems using one or more accelerometers for measurement or control of autopilots or roll, pitch or yaw stabilization damping.

Many other variations, modifications and applications of the invention will be apparent.

What is claimed is:

1. Apparatus for measuring the specific force and angular rate of a moving body by means of a plurality of accelerometers mounted on mutually-perpendicular axes, characterized in that the apparatus includes:
  (a) cyclic driving means for driving each accelerometer at a predetermined cyclic frequency "ω" to produce an output signal "a" from each accelerometer comprised of the angular rate vector "Ω" and the specific force vector "F;"
  (b) means for deriving, from each of said accelerometer output signals "a," a signal corresponding to the angular rate vector "Ω" which means includes:
    (1) multiplying means for multiplying said accelerometer output signal "a" by the function "sgn cos ωt" to produce the product signal "asgn cos ωt," and
    (2) integrating means for integrating said product signal over the cyclic period; and
  (c) means for deriving from each of said accelerometer output signals "a" a signal corresponding to the specific force vector "F," said latter means including integrating means for integrating said output signal "a" over the cyclic period.

2. Apparatus according to claim 1, wherein each of said deriving means (b) and (c) further includes:
  resetting means for resetting the respective integrating means at the end of each cyclic period, and
  sampling means for sampling and holding the contents of the respective integrating means just before being reset at the end of the respective cyclic period.

3. Apparatus according to claim 2, wherein each of said integrating means includes two integrating circuits connected in parallel, and switching means alternately enabling one and disabling the other of said two integrated circuits at the end of each cyclic period, to thereby provide each integrating circuit with a complete cyclic period for resetting.

4. Apparatus according to claim 2, wherein said cyclic drive means comprises a drive signal generator synchronized by pulses from a square-wave generator, said sqare-wave generator also supplying sampling pulses to said sampling means and resetting pulses to said resetting means in synchronism with the synchronizing pulses supplied to said drive signal generator.

5. Apparatus according to claim 1, wherein there are a triad of said accelerometers mounted on mutually-perpendicular axes.

6. Apparatus according to claim 1, wherein said cyclic means rotates each of said accelerometers at the predetermined frequency of rotation "ω".

7. Apparatus according to claim 1, wherein said cyclic frequency is from 30–60 Hz.

8. Apparatus for measuring the specific force and angular rate of a moving body by means of an accelerometer, characterized in that the apparatus includes:
  (a) cyclic driving means for driving said accelerometer at a predetermined cyclic frequency "ω" to produce an output signal "a" comprised of the angular rate vector "Ω" and the specific force vector "F;"
  (b) means for deriving, from said accelerometer output signal "a," a signal corresponding to the angular rate vector "Ω," including:
    (1) multiplying means for multiplying said accelerometer output signal "a" by the function "sgn cos ωt" to produce the product signal "asgn cos ωt," and
    (2) integrating means for integrating said product signal over the cyclic period; and (c) means for deriving from said accelerometer output signal "a" a signal corresponding to the specific force vector "F," said latter means including integrating means for integrating said output signal "a" over the cyclic period.

9. Apparatus for measuring the specific force of a moving body by means of an accelerometer, characterized in that the apparatus includes:
(a) cyclic driving means for driving said accelerometer at a predetermined cyclic frequency "$\omega$" to produce an output signal "a;" and
(b) means for deriving, from said accelerometer output signal "a," a signal corresponding to the angular rate vector "$\Omega$", including:
  (1) multiplying means for multiplying said acceleration output signal "a" by the function "sgn cos $\omega$t" to produce the product signal "asgn cos $\omega$t", and
  (2) integrating means for integrating said product signal over the cyclic period.

10. Apparatus according to claim 9, wherein said deriving means further include:
resetting means for resetting the respective integrating means at the end of each cyclic period, and
sampling means for sampling and holding contents of the respective integrating means just before being reset at the end of the respective cyclic period.

11. Apparatus according to claim 10, wherein said integrating means includes two integrating circuits connected in parallel, and switching means alternately enabling one and disabling the other of said two integrated circuits at the end of each cyclic period, to thereby provide each integrating circuit with a complete cyclic period for resetting.

12. A processor for deriving, from an accelerator output signal "a" produced by cyclically driving the accelerometer at a predetermined cyclic frequency "$\omega$" a first signal corresponding to the annular rate vector "$\Omega$" component of the accelerator output "a," and a second signal corresponding to the specific force vector component "F" of the accelerator output signal "a," comprising:
means for multiplying said accelerator output signal "a" by the function "sgn cos $\omega$t" to produce the product signal "asgn cos $\omega$t;"
first integrating means for integrating said latter product signal over the cyclic period, to produce a signal corresponding to the annular rate vector "$\Omega$"; and
second integrating means for integrating said accelerometer output signal "a" over the cyclic period, to produce a signal corresponding to the specific force vector "F".

13. The processor according to claim 12, further including:
resetting means for resetting the respective integrating means at the end of each cyclic period, and
sampling means for sampling and holding the contents of the respective integrating means just before being reset at the end of the respective cyclic period.

14. Apparatus according to claim 13, wherein each of said integrating means includes two integrating circuits connected in parallel, and switching means alternately enabling one and disabling the other of said two integrated circuits at the end of each cyclic period, to thereby provide each integrating circuit with a complete cyclic period for resetting.

15. A method of measuring the specific force and angular rate of a moving body by means of a plurality of accelerometers mounted on mutually-perpendicular axes, characterized by the steps:
(a) cyclicly driving each accelerometer at a predetermined cyclic frequency "$\omega$" to produce an output signal "a" from each accelerometer comprised of the angular rate vector "$\Omega$" and the specific force vector "F";
(b) deriving from each of said acceleromoter output signals "a," a signal corresponding to the annular rate vector "$\Omega$" by:
  (1) multiplying said acceleration output signals "a" by the function "sgn cos $\omega$t" to produce the product signal "asgno cos $\omega$t", and
  (2) integrating said product signal over the cyclic period; and
(c) deriving from each of said accelerometer output signals "a", a signal corresponding to the specific force vector "F", by integrating said output signal "a" over the cyclic period.

16. The method according to claim 15, wherein said cyclic drive means rotates each of said accelerometers at the predetermined frequency of rotation "$\omega$".

17. The method according to claim 15, wherein said frequency is from 30-60 Hz.

18. The method according to claim 15, wherein there are a triad of said accelerometers on mutually-perpendicular axes.

19. A method for deriving from an accelerometer output signal "a," produced by cyclically driving the accelerometer at a predetermined cyclic frequency "$\omega$" a first signal corresponding to the angular rate vector "$\Omega$" component of the accelerator output "a", and a second signal corresponding to the specific force vector "F" component of the accelerator output signal "a," comprising:
multiplying said accelerator output signal "a" by the function "sgn cos $\omega$t" to produce the product signal "asgn cos $\omega$t";
integrating said latter product signal over the cyclic period to produce a signal corresponding to the annular rate vector "$\Omega$"; and
integrating said accelerometer output signal "a" over the cyclic period, to produce a signal corresponding to the specific force vector "F".

* * * * *